United States Patent
Pecci

(10) Patent No.: US 7,902,326 B2
(45) Date of Patent: Mar. 8, 2011

(54) PROCESS FOR BREAKING THE CARBON CHAINS OF ORGANIC MOLECULES OF SOLID MATERIALS AND RELATED APPARATUS

(75) Inventor: Giorgio Pecci, Ferrara (IT)

(73) Assignee: I.T.E.R. S.r.l., Reggio Emilia (IT)

( * ) Notice: Subject to any disclaimer, the term of this patent is extended or adjusted under 35 U.S.C. 154(b) by 536 days.

(21) Appl. No.: 11/994,297

(22) PCT Filed: Jun. 16, 2006

(86) PCT No.: PCT/EP2006/005849
§ 371 (c)(1),
(2), (4) Date: Dec. 28, 2007

(87) PCT Pub. No.: WO2007/000257
PCT Pub. Date: Jan. 4, 2007

(65) Prior Publication Data
US 2008/0200737 A1    Aug. 21, 2008

(30) Foreign Application Priority Data
Jun. 29, 2005  (IT) .............................. BO2005A0432

(51) Int. Cl.
*C08C 2/06*     (2006.01)
*C08F 6/00*     (2006.01)

(52) U.S. Cl. ........................ 528/502; 422/137; 585/240
(58) Field of Classification Search .................. 422/137; 528/502 R; 585/240
See application file for complete search history.

(56) References Cited

U.S. PATENT DOCUMENTS
2,487,910 A  *  11/1949  Waddell et al. ................. 366/87

FOREIGN PATENT DOCUMENTS
| EP | 0747463 | * | 12/1996 |
| EP | 0747463 A1 | | 12/1996 |
| EP | 1405895 | * | 4/2004 |
| EP | 1405895 A1 | | 4/2004 |
| WO | 9600854 A1 | | 3/1996 |
| WO | WO 9608544 | * | 3/1996 |
| WO | 9809997 A1 | | 3/1998 |
| WO | WO 9809997 | * | 3/1998 |

* cited by examiner

*Primary Examiner* — Terressa M Boykin
(74) *Attorney, Agent, or Firm* — Browdy and Neimark, PLLC

(57) ABSTRACT

A process for breaking chains of organic molecules in which solid material comprising organic molecules is subjected to a mechanical stretching and squashing action, until it assumes a pasty consistency that by internal friction is subjected to a temperature and pressure increase in the absence of air, which breaks its long molecular bonds and determines the separation of the phases of the components.

18 Claims, 5 Drawing Sheets

PROCESS FOR BREAKING THE CARBON CHAINS OF ORGANIC MOLECULES OF SOLID MATERIALS AND RELATED APPARATUS

TECHNICAL FIELD

The present invention refers to a process for breaking the carbon chains of organic molecules of non-gaseous materials and related apparatus.

More specifically, the present invention refers to a process that by breaking the chains of organic molecules allows aliphatic or cyclic organic macromolecules, typically present in synthetic waste of plastic material, to be transformed into molecules with a carbon number preferably not greater than 20, typical of light fuels, and into molecules that will not be burnt that comprise polluting elements.

PRIOR ART

As known, the breaking of the carbon-carbon bonds of organic molecules takes place above all by thermal cracking, also known as pyrolisis, or cracking in the oil industry. The cracking reaction allows the molecular weight of the hydrocarbons present in the crude oil to be reduced to product lighter products.

Currently, cracking is carried out mostly with methods that are purely thermal (thermal cracking) or thermal-catalytic (catalytic cracking).

Thermal cracking processes are conducted both in liquid phase, and in gas phase, at variable pressure from 10 to 100 atm and at temperatures of between 450 and 600° C. The carbon-carbon bonds are broken by supplying heat from the outside.

Catalytic cracking processes, more widely used by the oil industry, are conducted with the use of suitable catalysts, for example azodicarbonamide, which allow operation at slightly lower temperatures, about 500° C., and at ambient pressure.

In both cases operating temperatures are reached by administering the necessary heat from the outside. Since administration from the outside is often hindered by the deposition of solid products (coke) on the exchange surfaces of the reactor, oxidation cracking is used, in which part of the required heat is developed inside the reaction by partial combustion of the hydrocarbons, supplying air or oxygen.

In the last case, at the same time as the cracking reactions, polymerisation and condensation reactions also take place with formation of new carbon-carbon bonds. Such reactions, which also comprise the formation of coke, are undesired and can be reduced, but not avoided, by selecting suitable operating conditions.

DISCLOSURE OF THE INVENTION

Therefore, there is a great need to have a process for breaking chains of organic molecules of non-gaseous materials that allows aliphatic molecules to be produced with a number of carbon atoms preferably not greater than 20, with a high yield of gaseous and liquid compounds, starting from aliphatic or cyclic organic macromolecules, with low costs and lower energy consumption.

The purpose of the present invention is to provide a process having characteristics such as to satisfy the aforementioned requirements and at the same time to avoid the aforementioned drawbacks with reference to the prior art.

A further purpose is to provide an apparatus specifically made to carry out such a process and that is at the same time simple, relatively easy to make, safe to use and that operates effectively, as well as being relatively inexpensive.

Such purposes are accomplished through a process and an apparatus in accordance, respectively, with claim 1 and with claim 5 of the present invention.

The dependent claims outline preferred and particularly advantageous embodiments of the process and of the apparatus according to the invention.

BRIEF DESCRIPTION OF THE DRAWINGS

Further characteristics and advantages of the invention shall become clearer from reading the following description provided as a non-limiting example, with the help of the figures illustrated in the attached tables, in which.

BEST MODE FOR CARRYING OUT THE INVENTION

With reference to the aforementioned figures, an apparatus for breaking the chains of organic molecules of solid materials, in accordance with the present invention is globally indicated with 1.

The apparatus 1 in brief comprises a reactor 10 with an inlet opening 11 for the organic material to be processed, in fragmented or ground form, which shall be discussed in greater detail hereafter, and an outlet opening 12 for the products obtained.

Figure 3:
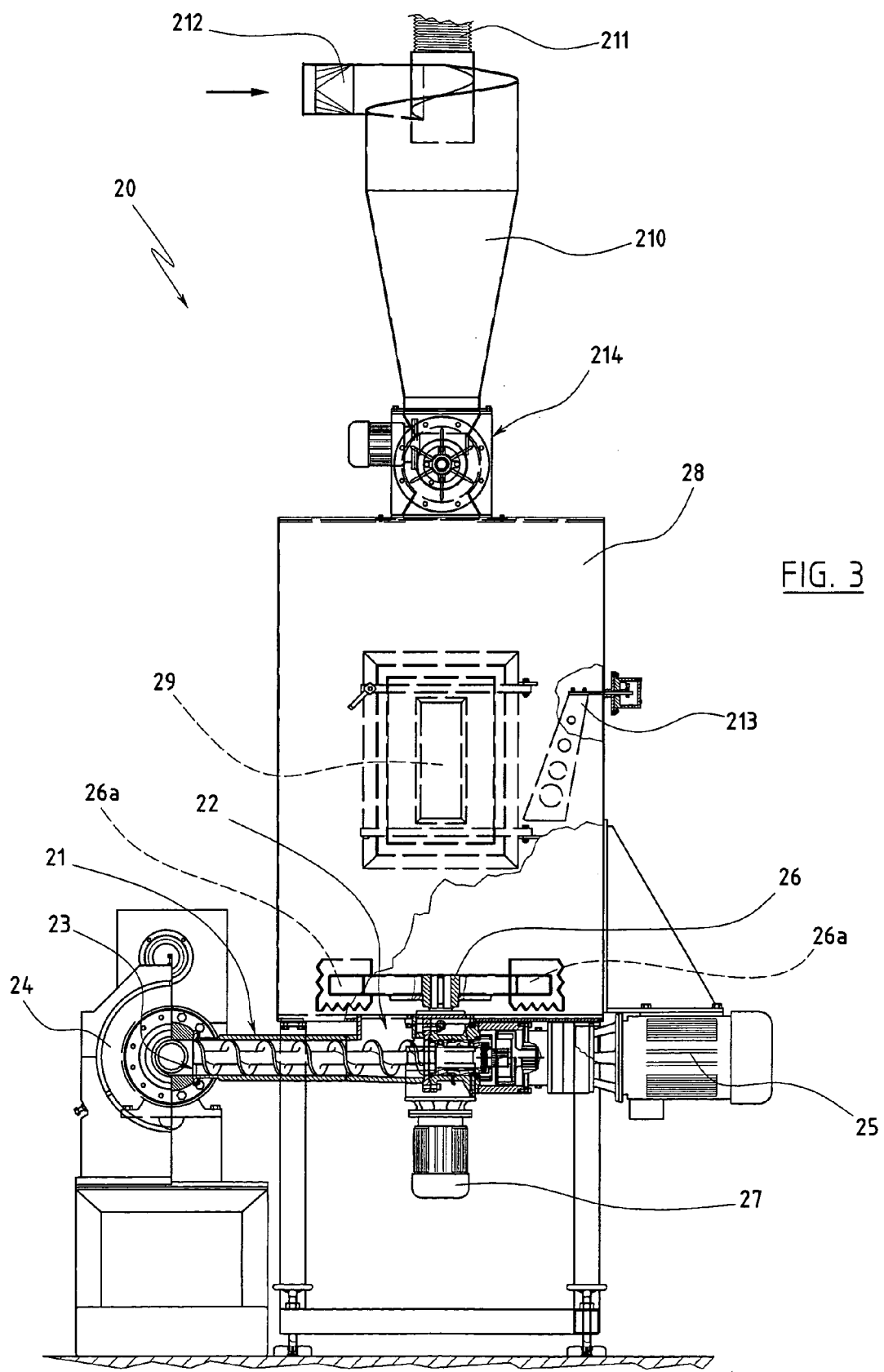
FIG. 3 shows a view taken along the line III-III of FIG. 1.

A feeding system 20 is connected to the inlet opening 11. In the example (see FIG. 3), said feeding system 20 comprising a horizontal worm screw 21 actuated through a geared motor 25 and provided at one end with a radial inlet mouth 22 for the material, facing upwards, and at the other end with an axial outlet mouth 23 placed in communication laterally with the inlet opening 11 of the reactor through a connection flange 24.

At the inlet mouth 22 an agitator 26 with four blades 26a is arranged, actuated by a geared motor 27 and positioned at the base of and inside a cylindrical container 28, which is provided with a level indicator 29 and with an inspection hatch 213, communicating at the bottom with the inlet mouth 22 and at the top with a loading hopper 210. Said hopper 210 communicates at the top with an aspirator 211 and a feeding duct 212 and at the bottom with a rotary valve 214. The hopper 210 comprises a cyclone separator, if necessary. The worm screw 21 has the function of dosing and feeding the material to the reactor 10.

Figure 1:
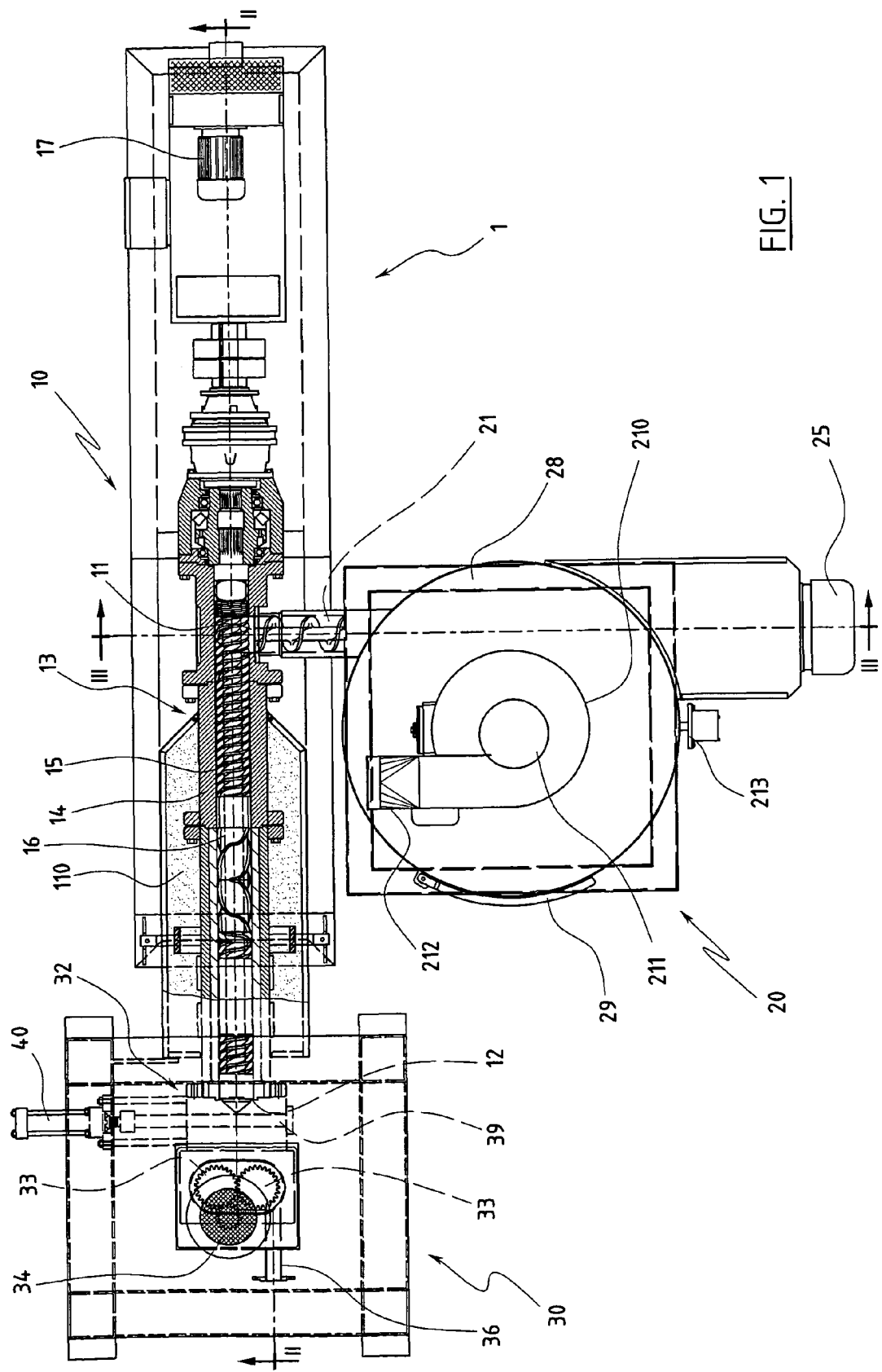
FIG. 1 shows a partially sectioned plan view of an apparatus for breaking the chains of organic molecules of solid materials.
Figure 2:
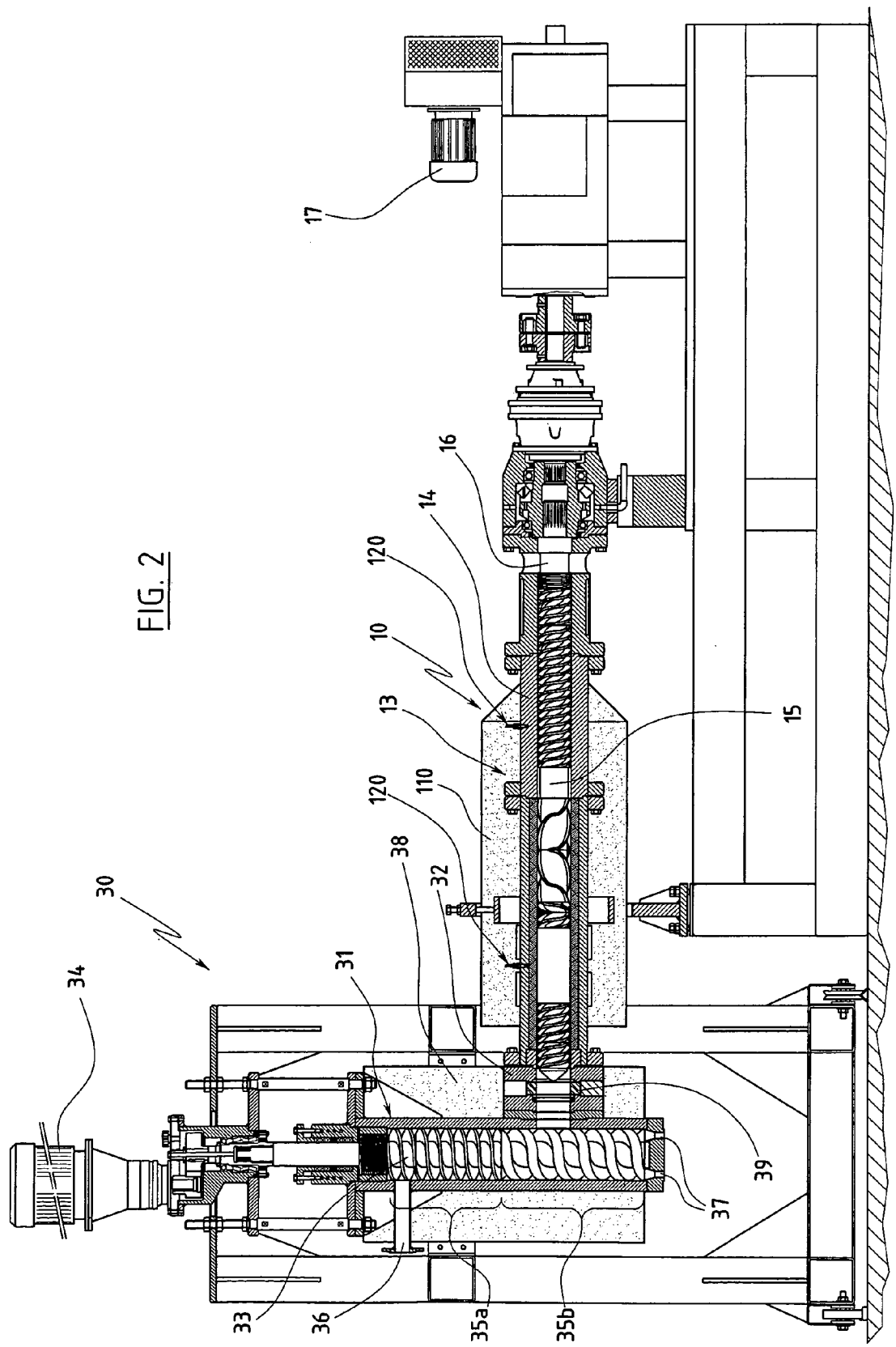
FIG. 2 shows a view taken along the line II-II of FIG. 1.

A separation system 30 is connected to the outlet opening 12 of the reactor 10. In the example (see left hand side of FIG. 2), said separation system 30 comprises a double worm screw-shaped extractor 31 with vertical axis, laterally connected to the outlet opening 12 of the reactor 10 through a flange 32 and closed sealed on top. The worm screw extractor 31 is provided with a pair of counter-rotating helicoids, or screws 33, (only one of which can be seen in FIG. 2) that intersect one another, actuated by a geared motor 34 to thrust downwards. Each screw 33 has two areas having the helix with a different pitch and thickness, a top area 35a where the helix has a small thickness (narrow crests) and has a small pitch, and a bottom area 35b where the same helix has a larger thickness (wide crests) and a larger pitch.

An outlet duct 36 for the products in gas a vapour phase laterally extends from the top area 35a of the extractor 31. Whereas the products in solid phase come out through axial openings 37, formed at the bottom.

The outlet duct 36 for gas/vapours is connected to a vacuum pump (not illustrated) suitable for placing the extractor 31 in depression promoting the extraction of the light components. The current of gas/vapours coming out from the extractor 31 is then cooled to obtain the liquid phase from it separating it from the gaseous phase.

The connection between the extractor 31 and the reactor 10 through the flange 32 takes place laterally and centrally with respect to the two helicoids 33 at the bottom area 35b where the helix has the greater thickness and pitch. The flange 32 is provided with a sluice valve 39 actuated by a hydraulic piston 40 to regulate the passage of products from the reactor 10 to the extractor 31.

In order to avoid the dispersion of heat, the worm screw extractor 31, usually made from steel, is insulated through an encasing jacket 38, made, for example, from ceramic wool.

In accordance with the present invention, the reactor 10 is in the form of an assembly 13 comprising a cylindrical jacket 14 with a rotor 15 having a substantially horizontal axis on the inside. The inlet opening 11 is arranged radially at an end of the jacket 14, whereas the outlet opening 12 is arranged axially at the opposite end intercepted by the valve 39. In particular, the rotor 15 is formed from a shaft 16 that comprises a plurality of squashing elements (15a-15h), which we shall discuss more hereafter, fitted onto the shaft 16 so as to rotate with it.

The shaft 16 is connected to a geared motor 17.

In order to break the carbon chains of the organic material fed through the feeding system 20, the rotor 15 has a configuration such as to manage to subject the material to a mechanical action such as to obtain a mixture with pasty consistency, i.e. that is soft and yielding to the touch.

Such a mechanical action causes a stretching and a squashing of the material in the reactor 10 that make it assume the pasty consistency.

In particular, this mechanical action creates great friction inside the organic material causing a temperature and pressure increase that triggers reactions that break the long molecular bonds, until products with short chains are obtained, i.e. products with a number of carbon atoms preferably less than 20.

The breaking of the molecular chains can occur with exothermal reactions, which themselves contribute to the temperature increase inside the reactor 10 until values of over 350° C. are reached, according to the internal and external friction that develops in the material and that also depends upon the type of material processed.

The pressure undergone by the material inside the reactor 10 is such as to generate the flow between the rotor 15 and the jacket 14, which gives rise to the squashing and stretching actions.

The peripheral speed of the worm screw shall be between 100 and 400 m/min. according to the viscosity of the material.

To avoid the formation of oxidised products, the reaction inside the reactor 10 is made to occur in the total absence of air. This also allows high yields of liquid and gaseous hydrocarbons with low molecular weight, i.e. preferably no more than 20 carbon atoms, to be obtained. In the illustrated embodiment and for better resistance to wear, the elements forming the peripheral part of the rotor 15 and that are in direct contact with the material are made from hydrocarbon-based sintered steel.

Figure 4:
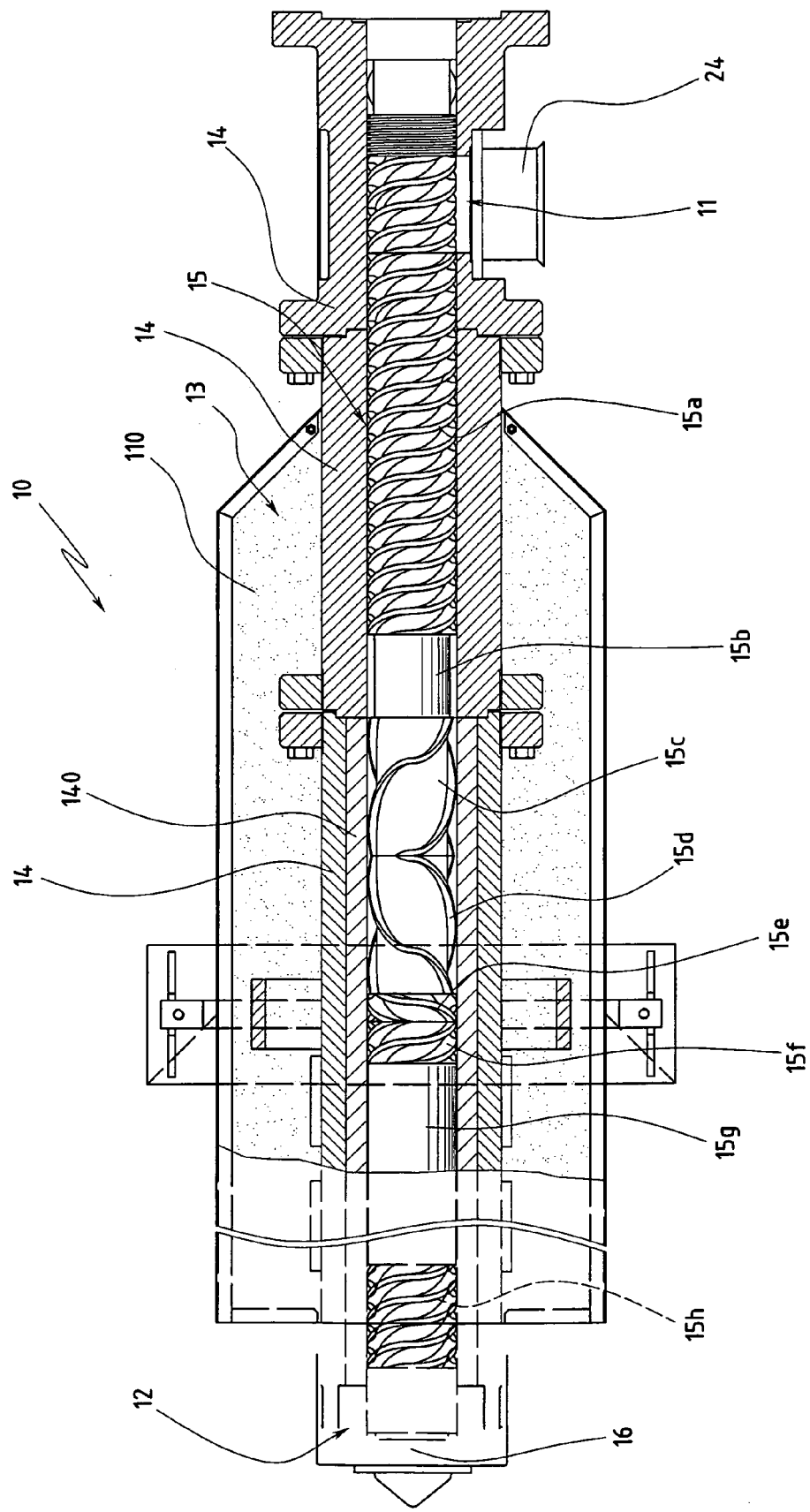
FIG. 4 shows a detail in section of the worm screw-shaped reactor of the apparatus of FIG. 1.

In the example (see FIG. 4), the elements, adjacent to one another to form a single rotor 15, are eight in number. Starting from the inlet opening 11 of the material (on the right in the figures) the following can be identified:

the jacket 14 having an internal diameter equal to D;

a first element 15a having a four-threaded screw, with constant pitch, diameter not less than D and with core equal to at least 0.5 D, suitable for thrusting the material towards the outlet, said first element 15a exerts a mechanical action such as to advance the material with the minimum possible temperature increase;

a second circular cylindrical element 15b having a diameter not greater than the diameter of the core of the element 15a sufficient to allow the material pushed forwards by the element 15a to flow into the interspace between said second element 15b and the jacket 14 and at the same time such as to prevent the passage of air coming from the inlet 11 thanks to the creation of a plug formed by the material itself that moves forward practically without temperature increase.

In the example said second element has a length at least equal to half the diameter D.

a third element 15c with single-threaded screw, with pitch P equal to at least 2 D, diameter of the core not less than 0.85 D, and length between 0.75 and 1.0 P suitable for thrusting the material towards the outlet 12;

a fourth element 15d with a screw identical to the third element 15c, but with opposite winding of the helix; such a fourth element 15d thrusts the material back to further increase the stress to which the material is subjected in order to reach the temperature necessary to trigger the reactions, possibly even exothermal, for breaking the long chains. Basically, the material is "remixed" in the area of the third 15c and fourth element 15d;

the thrusting towards the outlet 12 exerted by the element 15c overpowers the opposite thrusting exerted by 15d since in the portion in question the viscosity of the material drastically decreases;

a fifth element 15e with a screw, preferably not longer than 1.5 turns, with winding in accordance with the fourth element 15d, but with shorter pitch, in the example equal to 0.5 D;

a sixth element 15f with a screw, having the same pitch as the fifth element 15e with a screw with opposite winding of the helix, i.e. thrusting towards the outlet 12, and of slightly greater length, for example equal to 2 turns.

The length of the fifth and sixth element is about 0.85 D.

The fifth 15e and sixth element 15f also contribute to the creation of great friction inside the material, which overall advances towards the outlet 12;

a seventh circular cylindrical or frustoconical element 15g having a greater diameter than the second element 15b and such as to be arranged a distance of between 2 and 4 mm from the jacket 14, so as to obtain a stretching with high friction of the material that with the subsequent cooling reaches a liquid and gaseous consistency, with solid residues. In this area the breaking of the carbon chains is completed to obtain a high yield of low molecular weight compounds.

Figure 5:
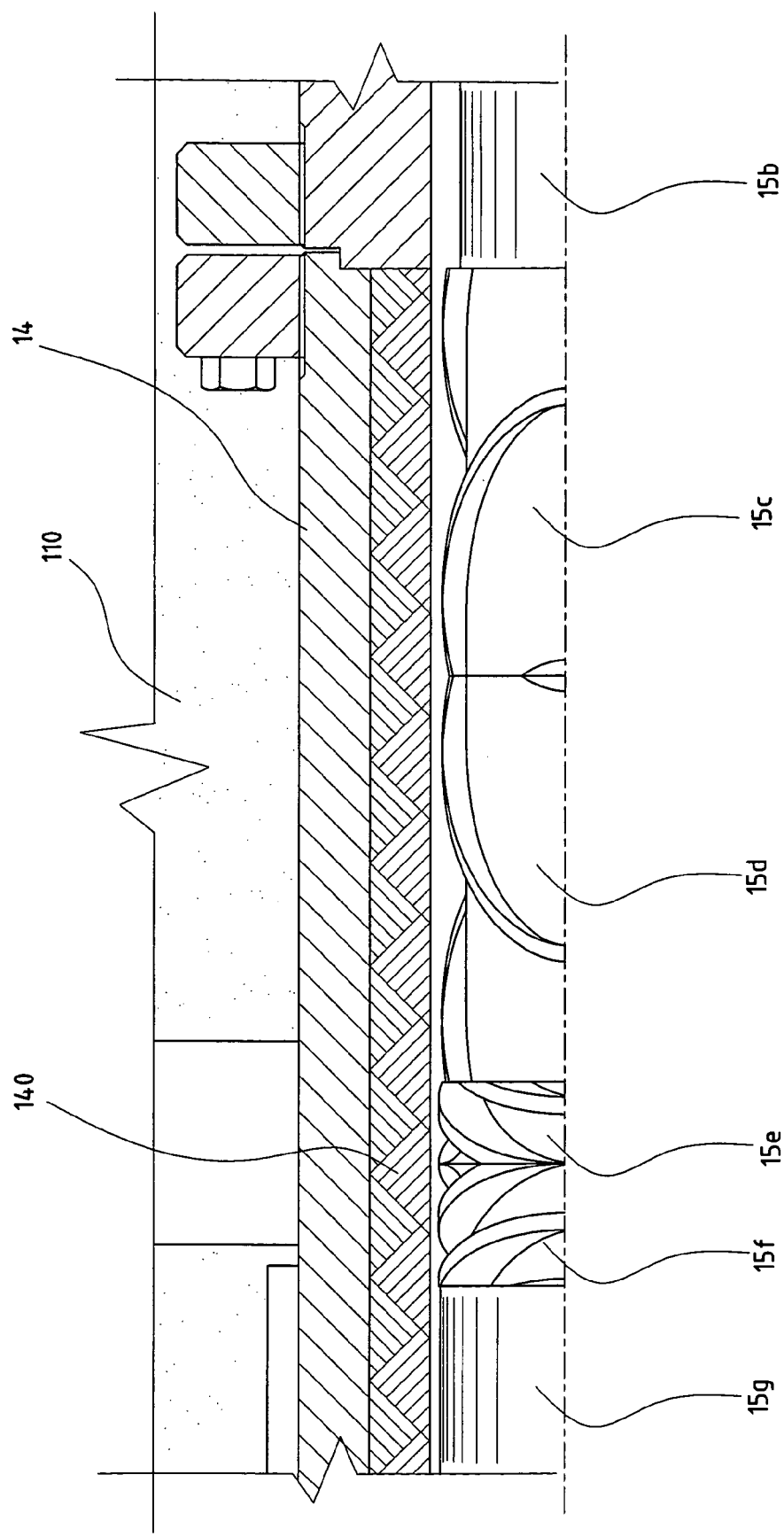
FIG. 5 shows an enlarged detail of FIG. 4.

In the example, said seventh element 15g is 3 to 4 times the length of D.

an eighth element 15h with a screw of the same type as the first element 15a, which thrusts the material that is now entirely processed, and therefore in the form of finished product, towards the outlet opening 12. Basically, the area (FIG. 5) occupied from the third element 15c up to the seventh element 15g is where the chemical breaking actions by thermo-mechanical action of the molecular chains take place.

In the example, the overall length of the rotor 15 is equal to 15 to 20 times D and the geared motor that actuates it absorbs from 0.2 to 0.6 kWh per Kg of material treated. Moreover, the jacket 14 is made in many pieces, in the example three. In particular, in the area in which the chemical reactions take place, the portion of jacket facing towards the inside of the reactor 10 is made with a ceramic cylinder 140 having high mechanical, thermal and chemical resistance.

In order to avoid the dispersion of heat, the reactor 10 is insulated through an encasing jacket 110, made, for example, from ceramic wool.

Operatively, the organic material to be processed, which comprises solid organic substances having chemical bonds with long chains, generally more than 20 carbon atoms, is fed through a suitable transporter, for example pneumatic or using a worm screw, in broken up solid form or paste form through the feeding duct 212. In the case of broken up solid form a cyclone separator is arranged in the loading hopper 210.

The material falls by gravity and passes through the rotary valve 214, into the container 28 where it is mixed by the agitator 26, which conveys the material towards the inlet mouth 22 of the worm screw 21. The worm screw 21 doses and feeds the material to the reactor 10 through the inlet opening 11. The rotor 15 thrusts the material, which during the journey undergoes the chemical transformation, towards the outlet opening 12. From here the reaction products are sent, by opening the valve 39, to the worm screw extractor 31 of the separation system 30, where the double screw 33 promotes the separation of the gas and solid phases. The products in gas and vapour phase go out through the duct 36, whereas the products in solid phase go out through the bottom openings 37.

The mechanical action exerted by the rotor 15 on the material generates friction that raises the temperature of the material itself up to at least 250° C. This allows the chemical reactions necessary to break the long chains of the organic compounds to begin (in the area of the third element 15c). The triggering of the reactions is caused by the mechanical action of the third element 15c. In addition, the total absence of air, thanks to the plug of material that is formed in the area of the second element 15b, prevents the formation of undesired oxidised products (such as aldehydes) and improves the yield of the compounds with shorter chains.

Basically, not only heat is not supplied from the outside, but the entry of air into the reactor 10 is also prevented, at least in the portion in which the chain-breaking reactions occur.

However, in the last portion, with the reactions already substantially having occurred, it is sometimes advisable to carry out heating with electrical resistances or equivalent means.

Therefore, the breaking of the molecular bonds is started and aided by the heat that develops inside the reactor following the mechanical action exerted exclusively by the rotor 15, which is made to rotate with peripheral speed of more than 100 m/min.

To make it easier to manage the apparatus it is possible to implement a control and management system that, suitably programmed, allows all of the operations to be carried out automatically.

The initial solid organic material can be of any origin, for example plastic materials (even non-homogeneous ones that therefore cannot be recycled with conventional processes), vulcanised or thermoplastic rubbers originating from industrial waste and vehicle tyres, vegetable meals, pasty or semi-liquid products, etc. In the treatment of materials originating from the recovery of tyres and vegetable-based meals, it has been observed that there are more solid carbon residues than with other materials.

To reduce such residues it is preferable to add hydrogen inside the reactor 10, in the portion in which the reactions take place (between the fourth 15d and the sixth element 15f). Alternatively, it is possible to use less expensive methane.

The described process applied to the treatment of tyres allows a vast range of products to be obtained, such as devulcanised rubbers that can be reused mixed with new raw materials, hydrocarbons like fuels of the liquid gas type (LPG), hydrocarbons like petrol or diesel, heavy oil, carbon residue that can also be used as an additive for bitumen, or else with possible addition of overheated steam, it can be used as a fuel.

The treatment of non-homogeneous plastic materials with the described process allows gaseous hydrocarbons, liquid hydrocarbons, and small amounts of solid carbon residues to be obtained.

As can be appreciated from what has been described, the process and the apparatus according to the present invention allow the requirements to be satisfied and allow the drawbacks mentioned in the introductory part of the present description with reference to the prior art to be overcome.

Indeed, the process allows the carbon links to be broken and allows a high yield of products with a low number of carbon atoms to be obtained, without needing to supply heat from the outside, with a consequent saving of energy, preventing the entry of air inside the reactor, in the absence of any catalyst, allowing gas and liquid fuel to be obtained.

Moreover, said process can be carried out with a simple apparatus that requires little maintenance, like for example a worm screw-shaped reactor.

In addition, the process does not give rise to any type of emission into the atmosphere.

A thermodynamic cracking process is thus obtained that uses just the mechanical action on the material to be treated, in the absence of air, causing a temperature increase up to the decomposition temperature by internal and external friction.

Obviously, a man skilled in the art can make numerous modifications and variations to the process and to the apparatus described above, in order to satisfy contingent and specific requirements, all of which are covered by the scope of protection of the invention, as defined by the following claims.

The invention claimed is:

1. Process for breaking chains of organic molecules of non-gaseous materials, wherein the material, comprising organic molecules is subjected to a mechanical stretching, squashing and drawing action, which by internal and external friction is subjected to a temperature increase in the absence of air, as a consequence of which long molecular bonds of said organic molecules are broken and therefore a gaseous fraction, a liquid fraction and a small solid fraction are separated, wherein the mechanical action is carried out through a worm screw characterized in that said mechanical action comprises a phase in which the material is subjected to the action of at least two consecutive portions of said worm screw having helixes wound in opposite directions.

2. Process according to claim 1, in which said material reaches temperatures of at least 250° C.

3. Process according to claim 1, characterised in that the mechanical action is carried out through a worm screw.

4. Process according to claim 1, in which the components of the liquid and gas phases have less than 20 carbon atoms.

5. Apparatus for breaking chains of organic molecules of non-gaseous materials, comprising a reactor which in turn comprises an airtight container in which mechanical means are contained for subjecting the material to a mechanical squashing and stretching action such as to cause an internal and external friction that results in a temperature increase sufficient to break long molecular bonds of said organic molecules and to obtain the separation of the liquid and gas phases with solid phase residues, characterized in that said mechanical means comprise a worm screw that has at least two consecutive portions having helixes wound in opposite directions.

6. Apparatus according to claim 5, characterised in that said recipient comprises a cylindrical jacket equipped with an inlet opening, an outlet opening in which a rotor is contained placed in rotation by suitable means.

7. Apparatus according to claim 6, characterised in that said rotor comprises a plurality of element fitted onto a rotary shaft.

8. Apparatus according to claim 7, characterised in that the rotor comprising at least one portion configured like a worm screw to advance the material.

9. Apparatus according to claim 8, characterised in that the rotor comprising at least two consecutive portions consisting of two portions of worm screw winding in opposite directions.

10. Apparatus according to claim 7, characterised in that at least one element of said plurality of elements has a cylindrical configuration suitable for creating an interspace between said at least one element and the jacket in which the material flows, forming a mobile plug that prevents the passage of air coming from the inlet opening.

11. Apparatus according to claim 7, characterised in that at least two consecutive portions of said rotor with helixes wound in opposite directions are downstream of said cylindrical element, and thrust the material towards their centre so as to further increase the internal friction to which the material itself is subjected.

12. Apparatus according to claim 7, in which at least one element of said plurality of elements has a cylindrical configuration having a diameter such as to create an interspace with the jacket of between 2 and 4 mm, so as to obtain a stretching with high friction of the advancing material.

13. Apparatus according to claim 5, further comprising a feeding system associated with said inlet opening and a separation system associated with said outlet opening.

14. Apparatus according to claim 13, in which said feeding system comprises a worm screw feeder suitable for dosing and feeding the material, arriving from a hopper to the reactor.

15. Apparatus according to claim 13, in which said separation system comprises a worm screw extractor having the axis inclined with respect to that of the rotor, laterally connected to the outlet opening of the reactor through a flange and provided with an outlet duct for the gaseous and vapours components and openings for the component in solid phase, said worm screw extractor being placed in depression.

16. Apparatus according to claim 15, in which said worm screw extractor is provided with a pair of counter-rotating screws that intersect one another.

17. Apparatus according to claim 15, in which said flange is provided with a sluice valve actuated by a hydraulic piston to regulate the passage of the products from the reactor to the extractor.

18. Apparatus according to claim 6, in which a hydrogen or methane source is connected to the final portion near to the outlet opening to limit the deposit of carbon in solid phase.

* * * * *